United States Patent [19]

Zückert

[11] 4,333,865

[45] Jun. 8, 1982

[54] AQUEOUS EMULSION OF AIR DRYING AND STOVING ALKYD RESINS AND PROCESS FOR PRODUCING SAID RESINS

[75] Inventor: Bertram Zückert, Graz, Austria

[73] Assignee: Vianova Kunstharz, A.G., Werndorf, Austria

[21] Appl. No.: 205,192

[22] Filed: Nov. 10, 1980

[30] Foreign Application Priority Data

Nov. 19, 1979 [AT] Austria ................................. 7335/79
Aug. 29, 1980 [AT] Austria ................................. 4371/80

[51] Int. Cl.³ ............................................. C08L 33/02
[52] U.S. Cl. .................................... 523/410; 523/402; 523/412; 528/297; 528/303; 528/300; 528/303.5; 528/110; 528/103.5
[58] Field of Search ............... 260/19 UA, 20, 22 CB, 260/22 CQ

[56] References Cited

U.S. PATENT DOCUMENTS

| | | | |
|---|---|---|---|
| 3,697,461 | 10/1972 | Troeger | 260/19 UA |
| 3,979,346 | 9/1976 | Zuckert | 260/22 CB |
| 4,002,582 | 1/1977 | Fritsche | 260/29.3 |
| 4,008,140 | 2/1977 | Fritsche | 260/29.3 |
| 4,147,674 | 4/1979 | Vasta | 260/22 CB |
| 4,229,331 | 10/1980 | Zuckert | 260/19 UA |

*Primary Examiner*—Paul R. Michl
*Attorney, Agent, or Firm*—A. W. Breiner

[57] ABSTRACT

Aqueous emulsions and a process for producing aqueous emulsions useful in air drying and stoving paints with improved stability over long periods are described. Fatty acid esters carrying ether-like bound polyethyleneglycol radicals are reacted with conventional alkyd resin raw materials to provide an alkyd resin intermediate which is esterified with an acidic vinyl copolymer carrying methacrylic acid and oil fatty acid radicals. The excellent stability characteristics of the products, despite the relatively low content of polyglycol of from 3 to 8%, is believed due to the substantially unsaponifiable linkage of the stabilizing groups to the resin molecule.

23 Claims, No Drawings

AQUEOUS EMULSION OF AIR DRYING AND STOVING ALKYD RESINS AND PROCESS FOR PRODUCING SAID RESINS

This invention relates to aqueous emulsions. More particularly, the invention relates to aqueous emulsions useful in air drying and stoving paints based on polyethyleneglycol-modified alkyd resins which have improved stability characteristics.

The preparation of water-emulsifiable alkyd resins which have been modified with polyethyleneglycol (PEG) has been described in the patent literature. According to most preparations, about 10 to 30% of PEG is incorporated into the alkyd resin through trans- or re-esterification as disclosed in U.S. Pat. Nos. 2,634,245; 2,853,459; 3,133,032; 3,223,659; 3,379,548; 3,437,615; 3,437,618; 3,442,835; 3,457,206, and 3,639,315; German Offenlegungsschrift No. 14 95 032, and British Pat. Nos. 1,038,696 and 1,044,821. The introduction of PEG through esterification has two severe disadvantages:

(1) The hydroxy groups of PEG can be reacted only in the same ratio as the hydroxy groups of the other polyols. Since water-dilutable resins in particular are formed with an excess of hydroxy groups, the introduction of PEG must remain incomplete. Therefore, an excess of PEG has to be used, necessarily leading to reduced hardness and water resistance of the films produced with the resins; and (2) The linking ester bridges are next to the hydrophilic PEG chain. Therefore, in the emulsion, they are subject to the direct impact of the water, leading to poor storage stability of the emulsions.

Many attempts have been made to improve the storage stability of the emulsions by introducing the PEG through other methods. According to U.S. Pat. No. 4,179,428, water-dilutable alkyd resins for stoving paints are produced by etherifying in a first step PEG with an amine-formaldehyde resin and subsequently linking the obtained reaction product through reaction of the excess functional groups with alkyd resin intermediates. According to European Patent Application No. 0 002 488, A 1 air drying alkyd resin emulsions are prepared in a process wherein PEG is first reacted with an excess of low molecular alkyl phenol resols and subsequently is bound through reaction of the remaining methylol groups of the resol to a drying oil by forming chromane ring linkages between resol and oil. The thus-obtained PEG-modified oil is a starting material in the preparation of water-emulsifiable alkyd resins. In both of the aforesaid cases, through reaction in more than one step, a nearly complete introduction of the PEG can be realized. Therefore, relatively low quantities of the PEG are required. Furthermore, the replacement of the easily esterifiable ester linkage through the more resistant N-methylol ether linkage or the practically unsaponifiable phenol methylol ether linkage leads to substantially enhanced storage stability. According to the described methods, emulsions can be prepared showing good paint characteristics which can be stored under favorable conditions, i.e., at temperatures of about 20° C., for one year.

Nevertheless, with the prior art emulsions it is necessary to further enhance the storage stability for the following reasons:

(1) The rheological properties of the emulsion are subject to severe changes on storage. The freshly prepared emulsions have a structural viscosity and, thus, give thixotropic paints with little tendency to settle. During storage, the structure breaks down, being reflected in a continuous decline in viscosity at low shear rates. Through these changes, the stored emulsions present problems in handling and in the preparation of paints therefrom with stable quality.

(2) The storage stability is strongly depending on the temperature. A rise of 10° or 20° C. leads to a drastic decline in viscosity and to coagulation. In countries with warm climate, storage is possible in climatized rooms only, (3) If the paints prepared from the emulsions are to be durable for longer periods, e.g., as in the case with maintenance paints, one year of total storage time is insufficient.

Accordingly, there is a strong demand for alkyd resin emulsions with excellent paint characteristics, which can be stored for longer periods and which do not undergo changes on storage with regard to their rheological properties.

It is theorized that the improved storage stability of the emulsions prepared according to European Patent Application No. 0 002 488 and U.S. Pat. No. 4,179,428 is attributable to the fact that the chain end carboxy groups are split off through hydrolysis. The carboxy groups are introduced through partial esterification of aromatic or aliphatic di- or tricarboxylic acids, such as o-phthalic acid, tetrahydrophthalic acid, or trimellitic acid. They cause, upon neutralization, the negative charge necessary for stabilizing the emulsion droplets. At the rate that the groups are split off, the emulsion becomes more coarse and thinner, and finally coagulates.

It is known from the literature that the resistance to saponification of acid partial ester linkages rises with the distance and the number of carbon atoms between the ester group and carboxy group. An improvement can be expected, if there are more than 2 carbon atoms, as in phthalic acid, or 3 carbon atoms, as in trimellitic acid, between the ester linkage and the carboxy group. Thus, efforts have been made to obtain more stable emulsions by using addition compounds of acrylic or methacrylic acid to unsaturated oil fatty acids as the means for introducing the carboxy groups. According to Deutsche Offenlegungsschrift No. 24 16 658, adducts are produced through reaction of acrylic or methacrylic acid with conjugated unsaturated fatty acids at from 250° to 300° C., which are subsequently processed through esterification according to known methods to give PEG-modified water-emulsifiable alkyd resins. The disadvantages of the disclosed method are in that the polyethyleneglycol is built into the molecule through esterification which can be easily split off. In order to obtain sufficient stability of the emulsion, a high amount of PEG, 5 to 15% (in the examples of from 8.5 to 9.5%), is employed. Furthermore, with the disclosed conditions, adducts with a maximum of 15% of acrylic acid result, while from 17–47% of the employed acrylic or methacrylic acid remain unreacted and must be removed by distillation. To obtain an acid value of about 20 mg KOH/g, considered necessary for sufficient stabilization of the emulsion, at least 14.6% of fatty acids are necessary for adduct formation with the required 2.58% of acrylic acid. Since water-dilutable air drying alkyd resins normally have a fatty acid level of from 30 to 40%, this quantity is about half of the fatty acids present. This amount of fatty acid must be considered lost for film formation by crosslinking since, due to the high reaction temperatures used for the preparation of the intermediate products, those double bonds undergo dimerization which are not blocked through adduct formation. This explains the relatively poor drying characteristics of the proucts prepared according to Deutsche Offenlegungsschrift No. 24 16 658.

At the present time, there are no products available which are fully satisfactory with regard to the essential properties, i.e., adequate storage stability as well as adequate drying speed. Furthermore, the use of the products prepared according to European Patent Application No. 0 002 488 is strongly curtailed due to the content of phenol resols and highly unsaturated oils. The products are dark and have a strong tendency to yellow. Light colored finishes can, therefore, not be formulated and their use is restricted to primers, fillers, and colored industrial enamels.

It has now been found that universal purpose water-emulsifiable alkyd resins with good overall performance can be obtained if, on the other hand, PEG is introduced into the alkyd resin in the form of specific etherification products and, on the other hand, the carboxy groups are introduced in the form of acidic polymers. Accordingly, the present invention is concerned with a process for producing improved aqueous emulsions for air drying and stoving paints based on polyethyleneglycol-modified alkyd resins, characterized in that—

(a) fatty acid esters are formed wherein the saturated or unsaturated fatty acid radicals carry more than 10 C-atoms and contain ether-like bound polyethyleneglycol radicals having an average molecular weight of between 500 and 5000, the hydroxy group of the polyethyleneglycol radical being optionally etherified with a further saturated fatty acid ester or with a low monoalcohol;

(b) the fatty acid esters are reacted through reesterification in known manner with conventional alkyd resins raw materials to provide an alkyd resin intermediate with an acid value of below 15, preferably below 5 mg KOH/g, a hydroxyl value of between 50 and 250 mg KOH/g, and a PEG-level of from 3.5 to 15% by weight;

(c) 50 to 90% by weight of the alkyd resin intermediate are esterified with from 10 to 50% by weight of a copolymer containing—
6–40% by weight of methacrylic acid,
20–55% by weight of an unsaturated oil fatty acid with an iodine number of at least 125, and
20–70% by weight of one or more vinyl and/or vinylidene compounds carrying no functional group other than the double bond
until an acid value of from 10 to 35, preferably from 12 to 25 mg KOH/g and an intrinsic viscosity (chloroform, 20° C.) of from 6 to 15 ml/g is attained, with a PEG-level of from 3 to 8%; and (d) the thus-modified alkyd resin is emulsified in water with neutralization of the carboxy groups with ammonia or amines, and the addition of a maximum of 20% by weight of organic auxiliary solvents.

According to the present invention, alkyd resin emulsions can be produced which are ideal binders for top quality air drying and stoving paints. In particular, the emulsions show excellent storage stability over long periods, also at temperatures prevailing beyond the temperate zones. Additionally, the emulsions fulfill the requirements essential for air drying and stoving paints, including drying capacity and film performance. The excellent performance of the emulsions of the invention is the result of a tailored molecular structure, the essential feature being to obtain the best possible resistance to hydrolysis of the incorporated stabilizing hydrophilic groups. Component (a) as above defined can be constructed in various ways:

(a1) 1 mole of a polyethyleneglycol with an average molecular weight of between 500 and 5000 is reacted at from 100° to 150° C., in the presence of a catalyst, with from 1.7 to 2.1 mole of a 1,2-epoxide compound of the general formula—

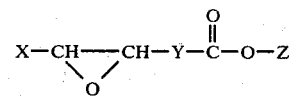

where X is an alkyl radical with from 2 to 8 carbon atoms, Y is an alkylene radical with from 7 to 11 carbon atoms, Z is a saturated, aliphatic, cycloaliphatic or aromatic hydrocarbon radical with from 1 to 10 carbon atoms, until an epoxy value of below 0.02, preferably below 0.01, is reached.

Compounds of the aforesaid general formula are obtained through epoxidation of esters of monohydric alcohols with mono-unsaturated fatty acids. Examples are lauroleic acid, myristoleic acid, palmitoleic acid, oleic acid, or erucic acid. Particularly suited are epoxidation products of esters of oleic acid. The alcohol components are monohydric saturated aliphatic, cycloaliphatic, and aromatic alcohols with from 1 to 10 carbon atoms. Epoxidation is carried out according to known methods, such as with hydrogen peroxide and formic acid. The product according to the general formula contains one 1,2-epoxy group per molecule and is present at a level of at least 75% of the technical blend. Products of the aforesaid type are commercially available and are defined as n-alkyl- or i-alkyl epoxy fatty acid esters.

Suitable polyethyleneglycols for use herein have an average molecular weight of from 500 to 5000. They are reacted, in the presence of catalysts, with the epoxy compound through etherification, in a mole ratio of from 1:17 and 1:2.1. In the ideal case, in this reaction, the PEG molecule is bound on both sides with an ether linkage to a fatty acid ester. The technical method of preparation is to eliminate the water from the PEG by vacuum distillation with the aid of an entraining agent, add the catalyst, and heat to 100° to 150° C. Then, in the course of several hours, the epoxy compound is added and the temperature is held, until the epoxy number is 0.02 and preferably below 0.01. Suitable catalysts are, for example, sulphuric acid, perchloric acid, aluminium chloride, and boron trifluoride and its etherates. The etherification product thus obtained (polyethyleneglycol diether) is then reacted through reesterification, with separation of the monohydric alcohols from the originally used monoepoxy compound, with the compounds normally used in alkyd resin preparation, such as polyols, fatty acids, and/or oils as well as optionally with aromatic monocarboxylic acids and/or a portion of the dicarboxylic acids, as above noted, in the presence of suitable catalysts such as litharge or calcium hydroxide, at about 250° C. The alcohol emitted from the intermediate product is removed quantitatively through distillation. Subsequently, the remainder of the dicarboxylic acids, optionally together with other polyols and/or fatty acids, is added and esterified in known manner until the acid value of the alkyd resin intermediate thus prepared has fallen to below 15, preferably below 5 mg KOH/g and has attained an intrinsic viscosity of from 4 to 10 ml/g (chloroform, 20° C.). The raw materials for the alkyd resin intermediate are known to those skilled in the art, making unnecessary a detailed enumeration.

The preparation may be varied in that first all components, except for the PEG-modified fatty acid ester, are processed to an alkyd resin with an acid value of below 15 mg KOH/g and then the polyethyleneglycol diether is incorporated into this alkyd resin through re-esterification. In place of the alkyd resin, fatty acid esters of epoxy resins of the Bisphenol A type or fatty acid esters of styrene-allylalcohol-copolymers can be used.

Preferably, the alkyd resin intermediates should be formulated in order that the fatty acid content, including that resulting from the epoxy compound, lies between 1 and 60%, and the hydroxyl value is between 50 and 250 mg KOH/g. The PEG-content of the products lies between 3.3 and 15%. In place of uniform alkyd resin intermedaites, mixtures may also be used, with one component, if desired, being free of PEG.

In the final product there will be alkyl chains with at least 7 carbon atoms between the PEG chains and the ester linkages. Thus, split-off of PEG through hydrolysis is substantially hindered. It is theorized that the secondary hydroxy groups formed during the etherification reaction between PEG and the epoxy group will not take part in the re-esterification and esterification reactions during the preparation of the alkyd intermediate, due to the steric hindrance and the excess of primary hydroxy groups.

(a2) A second type of component (a) as above defined is obtained through reaction of an epoxidized glyceride oil with an epoxy oxygen content of from 4 to 9%, with from 0.8 to 0.95 moles of a monoalkoxypolyethyleneglycol per oxirane group of the epoxidized oil, the polyglycol radical advantageously having an average molecular weight of from 500 and 3000.

The epoxidized glyceride oils used according to the invention are the commercially available products obtained through epoxidation of drying oils with iodine numbers of from 100 and 180, particularly of soya oil, by means of per-acids. Other epoxidized oils are derived from linseed oil, sunflower oil, cotton seed oil, and the like. The epoxy oxygen content of these oils ranges between 4 and 9%.

As the monoalkoxypolyethyleneglycols (APG), products are used with an average molecular weight of from 500 to 3000. The alkoxy group should have from 1 to 4 carbon atoms.

In order to bind the APG as quantitatively as possible, a slight excess of epoxy groups is applied according to the invention. For the present invention a ratio of from 0.8 to 0.95 moles of APG per mole of oxirane group has proved favorable. Due to the higher functionality of epoxidized oils, it has been found desirable to use APG and not polyethyleneglycols. The reaction is carried out according to the methods described on pages 9–10 and pages 15–20. The reaction is not finished until a conversion of at least 95% of the hydroxy groups of the APG is completed, determined by the epoxy number. It is assumed that the secondary hydroxy groups formed upon the opening of the oxirane groups do not react to any substantial extent due to steric hindrance.

Further processing of the APG-ethers is carried out according to the method provided for the PEG ethers. The complete build-in of the APG-ethers is effected in any case after a reaction time of 90 minutes, maintaining a reaction temperature of from 240°–250° C. The quantity of the APG-ether is chosen in order that the content of polyethyleneglycol corresponds to a portion of the alkyd resin intermediate of from 3.3 to 15%.

Through this modification the use of commercially available and economical raw materials is essentially broadened, without a negative effect on the stability of the final products being observed.

The carboxy groups necessary for stabilizing the emulsions are introduced, according to the present invention, through polymers which are obtained through free-radical polymerization of 6–40% by weight of methacrylic acid, 20–55% by weight of a drying fatty acid with an iodine number of at least 125, and 20–70% by weight of one or more vinyl and/or vinylidene compounds, particularly of acrylic compounds which carry no reactive groups other than double bonds.

Suitable drying fatty acids for the preparation of these intermediate products are those with conjugated double bonds, such as the dehydrated castor oil fatty acids or isomerized fatty acids, or those with isolated double bonds such as the technical soya-, safflower-, or linseed oil fatty acids. Isolated unsaturated fatty acids have to be used in excess, due to their weaker reactivity. If the fatty acid has not reacted completely during the polymerization, the remainder is built into the alkyd resin intermediate during esterification. The highest possible polymerization conversion is desired. Suitable vinyl and vinylidene compounds are styrene, vinyltoluol, vinylesters of acetic acid, propionic acid, or versatic acid. The preferred materials are the commercially available alkyl esters of acrylic or methacrylic esters. The selection is made according to the compatibility of the materials with the alkyd resin intermediate. Normally, the polymers with the best compatibility also show the best emulsifying effect. The polymerization is effected at 80° to 140°, preferably 90° to 110° C. Suitable initiators are compounds forming free radicals upon splitting at the reaction temperature. Dibenzoylperoxide is the preferred initiator. In order to limit the molecular weight, the normal chain transfer agents for polymerization, such as tert. dodecyl mercaptan, can be used. The end point of the polymerization is assumed to be attained when the non-volatile residue remains constant, i.e., when the volatile monomers have been substantially exhausted from the reaction mixture. With the quoted conditions, side reactions such as fatty acid dimerization are substantially reduced. Thus, the fatty acids which are not copolymerized remain unchanged and retain their capacity for oxidative crosslinking until after their introduction into the alkyd resin intermediate. The carboxy groups of the methacrylic acid show tertiary configuration after the polymerization reaction and, thus, reduced reactivity. Thus, in the reaction between the alkyd resin and the polymerization resin they remain substantially unchanged and provide means for stabilization of the emulsions after their neutralization. In the final product, there are the long hydrophobic alkyl chains of the fatty acids between the stabilizing carboxylate groups and the ester bridges whereby hydrolytic splitting is severely hindered.

The introduction of the vinyl compounds and the acrylates provides a means for monitoring the compatibility range and the amphipatic character of the polymer. Thus, on the one hand, through regulation of the compatibility with the alkyd component, an easier building-in of the polymer is effected. On the other hand, an emulsifying effect is obtained in cases where the polymer is not fully incorporated or is split off afterwards.

The alkyd resin intermediate and the polymer are combined at from 170°–200° C. in order that, after complete esterification of the fatty acid carboxy groups of the polymer, an acid value of from 10–35, preferably 12–25 mg KOH/g and an intrinsic viscosity of from 6 to 15 ml/g (chloroform, 20° C.) results. The PEG content of the final products ranges preferably from 3–8%.

The resins are diluted with a maximum of 20%, and preferably 5–15%, of organic auxiliary solvents and emulsified at temperatures of from 40° to 80° C., in water containing ammonia or organic amines, in a quantity sufficient to neutralize from 50 to 100% of the carboxy groups of the resin. Suitable auxiliary solvents are the alcohols or ether alcohols, such as n-butanol or ethyleneglycolmonobutylether. Suitable amines include triethylamine and dimethylethanolamine.

The emulsions prepared according to the present invention serve, as shown in the examples, as basis for air drying and stoving paints, and can be applied by any normal method. In the preparation of stoving paints, water compatible amineformaldehyde resins are added as crosslinker.

The following examples are illustrative of the invention. All parts or percentages are by weight, unless otherwise stated. The stated values of the intrinsic viscosity are measured in chloroform at 20° C.

(I) Preparation Of The Polyethyleneglycol-Diethers (PGDÄ) (Component a 1):

Utilizing the components listed in Table 1, polyethylenglycol-diethers (PGDÄ) are prepared as follows:

10% of toluol is added to eliminate the water from the polyethyleneglycol and the blend is heated to 120° C. and held under vacuum, until distillation has ceased. Then the temperature is reduced to 110° C. and the BF$_3$-complex is added. The epoxy fatty acid ester is then added continuously in the course of 5 hours. The temperature held at 110° C. until the epoxy number has fallen below 0.01.

TABLE 1

|  | PGDÄ | | |
| --- | --- | --- | --- |
|  | 1 | 2 | 3 |
| PÄG 1500 | 750 | — | — |
| PÄG 3000 | — | 1500 | 750 |
| PÄG 600 | — | — | 150 |
| BF$_3$—diethylether complex | 5 | 8.3 | 5.7 |
| EPF 1 | 380 | — | 400 |
| EPF 2 | — | 350 | — |

PÄG: polyethyleneglycol (the figure represents the average molecular weight of the glycol)
EPF 1: an n-alkyl epoxy stearate with a molecular weight of 377 and a content of epoxy oxygen of 4.5%
EPF 2: an i-alkyl epoxy stearate with a molecular weight of 380 and an epoxy oxygen content of 4.5%

(II) Preparation Of The APG-Ethers (APGÄ) (Component a 2):

Utilizing the components listed in Table 2, the APGÄ are prepared as follows:

10% of toluol is added in order to eliminate the water from APG. The blend is heated to 120° C. and held at this temperature, under vacuum, until distillation has ceased. Then the temperature is reduced to 110° C. and the BF$_3$-complex is added. The epoxidized glyceride oil is then added continuously in the course of 5 hours, while the temperature is maintained at 110° C., until, according to the epoxy number, conversion of at least 95% of the hydroxy groups of the APG has been attained.

TABLE 2

|  | APGÄ | |
| --- | --- | --- |
|  | 1 | 2 |
| MGP 1100 | 1000 | — |
| MGP 2400 | — | 2200 |
| BF$_3$—diethylether complex | 5.5 | 11.0 |
| EO 1 | 188 | — |
| EO 2 | — | 267 |

MGP: methoxyethyleneglycol (the figure represents the average molecular weight)
EO 1: an epoxidized linseed oil with an epoxy oxygen content of 8.5% according to an epoxy equivalent of 188
EO 2: an epoxidized soya oil with an epoxy oxygen content of 6% according to an epoxy equivalent of 267

(III) Preparation Of The Alkyd Resin Intermediates:

The characteristics of the alkyd resin intermediates are listed in Table 3.

Alkyd Resin Intermediate A 1: 110 g of pentaerythritol, 50 g of PGDÄ 1, 120 g of p.tert.-butylbenzoic acid, 60 g of phthalic anhydride, 20 g linseed oil fatty acid, 0.8 g of zinc octoate (8% zinc), and 0.8 g of calcium octoate (4% calcium) are heated to 250° C. within 4 hours and held at this temperature for 1 hour. During this phase, in addition to the distillation water, 5 g of a water-insoluble liquid distill. The whole distillate is discharged and discarded. The temperature is reduced to 200° C. 70 g of dehydrated castor oil fatty acid and 36 g of phthalic anhydride are added. The temperature is again raised to 200° C. and the esterification is continued, with azeotropic solvent heating in xylol, to an acid value of below 3 mg KOH/g. The resin is discharged undiluted.

Alkyd Resin Intermediate A 2: 165 g of China wood oil, 45 g of linseed oil fatty acid, 97 g of PGDÄ 2, 185 g of pentaerythritol, 155 g of p-tert.butylbenzoic acid, 0.8 g of zinc octoate (8% zinc), and 1.6 g of calcium octoate (4% calcium) are heated to 250° C. within 60 minutes and held, 6 g of water-insoluble distillate distilling. The batch is cooled to 150° C. and 130 g of hexachloroendomethylene tetrahydrophthalic acid, 80 g of tetrahydrophthalic anhydride and 0.6 g of triphenylphosphite 50% in xylol are added. At 190° C., with azeotropic distillation with xylol, esterification is continued until an acid value of below 5 mg KOH/g is obtained.

Alkyd Resin Intermediate A 3 (PEG-free alkyd resin): 85 g of China wood oil, 80 g of p-tert.butylbenzoic acid, 95 g of pentaerythritol, 30 g of benzoic acid and 25 g of tall oil fatty acid are pre-esterified or re-esterified for 2 hours at 230° C. The temperature is reduced to 200° C., 80 g of phthalic anhydride and 15 g of a phenol resol from 1 mole of p-tert.butylphenol and 2 moles of formaldehyde are added. At 190° C., with azeotropic distillation, esterification is continued until an acid value of below 5 mg KOH/g is obtained.

Alkyd Resin Intermediate A 4: Using the alkyd resin intermediate A 1, an alkyd resin is prepared with a higher fatty acid level, by replacing the 120 g of p-tert.butylbenzoic acid with 40 g of p-tert.butylbenzoic acid and 130 g of tall oil fatty acid. The processing method is as set forth in A 1.

Alkyd Resin Intermediate A 5: 285 g of trimethylol propane, 55 g of pentaerythritol, 105 g of PGDÄ 3, 120 g of coconut fatty acids, 240 g of phthalic anhydride, 55 g of adipic acid, 27 g of benzoic acid, and 1.8 g of calcium octoate (4% calcium) are heated to 240° C. within 3 hours and held at about 240° C. for 60 minutes. During this phase about 8 g of a water-insoluble distillate are distilled off. Then, with azeotropic distillation, the esterification is carried to an acid value of below 2 mg KOH/g.

Alkyd Resin Intermediate A 6: 120 g of a copolymer which is an esterification product of a styrene-allyl alcohol having a hydroxyl content of 7.7%, 20 g of PGDÄ 1, 0.3 g of calcium octoate (4% calcium) and 0.3 g of zinc octoate (8% zinc) are heated to 250° C. within 3 hours and held at about 250° C. for 1 hour. 2 g of a water-insoluble distillate are distilled off. Then, 40 g of tall oil fatty acids and 13 g of p-tert. butyl benzoic acid are added and, with azeotropic distillation with xylol, at 220° C., the esterification is carried to an acid value of below 2 mg KOH/g.

Alkyd Resin Intermediate A 7: A blend of 40 g of tall oil fatty acid, 13 g of p-tert.butyl benzoic acid and 0.2 g of triethylamine are heated to 150° C. Then, 120 g of a modified epoxy resin ester, with a diepoxide on the basis of Bisphenol A with an epoxy equivalent of from 750–820 are added in small increments in the course of 1 hour. The temperature is raised to 180° C. and 0.3 g of calcium octoate (4% calcium), 0.3 g of zinc octoate (8% zinc), and 20 g of PGDÄ 1 are added. In the course of 2 hours, the temperature is raised to 250° C. and held at about 250° C. for 60 minutes. 2 g of a water-insoluble distillate are distilled off. Then the resin is esterified at 220° C., with azeotropic distillation with xylol to an acid value of below 2 mg KOH/g.

Alkyd Resin Intermediate A 11: This intermediate corresponds to alkyd resin A2 except that 97 g of PGDÄ 2 is replaced with 94 g of APGÄ 1. The re-esterification phase at 250° C. was prolonged to 120 minutes.

Alkyd Resin Intermediate A 12: This intermediate corresponds to alkyd resin intermediate A 5 except that the 105 g of PGDÄ 3 is replaced with 81 g of APGÄ 2. The re-esterification phase at 240° C. was prolonged to 120 minutes.

TABLE 3

| | Solids Content % | Fatty Acid Content % | Acid Value mg KOH/g | Hydroxyl Value mg KOH/g | Intrinsic Viscosity ml/g |
|---|---|---|---|---|---|
| A 1 | 94 | 23.5 | 2.3 | 126 | 7.2 |
| A 2 | 94.3 | 27 | 4.7 | 189 | 8.2 |
| A 3 | 93.5 | 30 | 4.3 | 136 | 6.5 |
| A 4 | 95.2 | 44 | 2.9 | 105 | 6.8 |
| A 5 | 96.4 | 17 | 0.7 | 224 | 7.3 |
| A 6 | 95.1 | 24 | 1.7 | 96 | 7.0 |
| A 7 | 95.6 | 23.6 | 1.8 | 125 | 9.7 |
| A 11 | 94.2 | 27 | 2.9 | 195 | 7.9 |
| A 12 | 96 | 15.8 | 1.6 | 231 | 7.6 |

PREPARATION OF POLYMERS

The compositions and characteristics of the polymers P 1 to P 5 are listed in Table 4.

TABLE 4

| | P 1 | P 2 | P 3 | P 4 | P 5 |
|---|---|---|---|---|---|
| Part 1: | | | | | |
| Linseed oil fatty acid | 60 | 60 | — | — | 50 |
| Isobutylmethacrylate | 8 | — | — | — | — |
| Vinyltoluol | 6 | 14 | — | — | — |
| Methacrylic acid | 6 | 6 | — | — | — |
| Dibenzoyl peroxide (50%) | 3 | 3 | — | — | — |
| Dodecylmercaptan | 0.2 | 0.2 | — | — | — |
| Xylol | 45 | 45 | 45 | 45 | 90 |
| Isopropanol | 45 | 45 | 45 | 45 | — |
| Part 2: | | | | | |
| Isobutylmethacrylate | 32 | — | 40 | 30 | — |
| n-butylacrylate | — | — | — | — | 20 |
| Vinyltoluol | 24 | 56 | 30 | 30 | 65 |
| Methacrylic acid | 24 | 24 | 30 | 40 | 15 |
| Dodecylmercaptan | 0.8 | 0.8 | 1 | 1 | 1 |
| Part 3: | | | | | |
| Linseed oil fatty acid | 40 | 40 | — | — | — |
| Dehydrated castor oil fatty acid | — | — | 40 | 40 | 20 |
| Xylol | 5 | 5 | 5 | 5 | 16 |
| Isopropanol | 5 | 5 | 5 | 5 | — |
| Dibenzoylperoxide | 11 | 11 | 10 | 10 | 14 |
| Total | 315 | 315 | 251 | 251 | 291 |
| Constants: | | | | | |
| Fatty acid content (%) | 50 | 50 | 28.5 | 28.5 | 41 |
| Methacrylic acid content (%) | 15 | 15 | 21.5 | 28.5 | 8.8 |
| Non-volatile % | 65 | 65 | 60 | 60 | 60 |
| Acid value mg KOH/g | 186 | 189 | 194 | 222 | 133 |
| Intrinsic viscosity dimethylformamide, 20° C., ml/g | 5.2 | 5.1 | 8.6 | 8.9 | 6.7 |

Part 1 is charged to a reaction vessel and heated to boiling temperature (about 90° C.) for each of P 1, P 2, P 3, and P 4, and to 110° C., for P 5. Then, with the temperature being maintained, Parts 2 and 3 are added simultaneously and continuously over a period of 5 hours. The temperature is then held until the determination of the non-volatile content shows the total polymerization of the volatile monomers.

EXAMPLES 1–9

The alkyd resin intermediates are blended with the polymers in the ratios listed in Table 5 and heated to 180° C. In this method, the solvents, under vacuum at the end, are distilled off. Then, esterification is carried on at from 180° to 200° C., until acid value and intrinsic viscosity correspond to the values given in Table 5.

In order to accelerate the esterification, small quantities of xylol may be added as entraining agent. However, at the end of the reaction, the entraining agent must be removed through vacuum distillation. To alleviate the emulsification, the resins are dissolved in ethyleneglycol monobutylether (non-volatile, see Table 5).

The resins are emulsified in water, at from 50°–70° C., by adding a mixture of 4:1 of triethylamine and dimethylethanolamine. The quantities of amine and water are chosen in order that the pH-value of the emulsions lies between 8.0 and 9.5, and the viscosity, measured at 20° C. with the Brookfield rotation viscosimeter, RVF, Spindle No. 7, 4 rpm, lies between about 100 and 200 Pa.s.

TABLE 5

Compositions And Constants Of The Alkyd Resins Modified According To The Present Invention.
(The Figures Of The Composition Refer To 100% Resin Solids)

| | \multicolumn{9}{c}{Examples} | | | | | | | | |
|---|---|---|---|---|---|---|---|---|---|
| | 1 | 2 | 3 | 4 | 5 | 6 | 7 | 8 | 9 |
| A 1 | 80 | — | — | — | — | — | — | — | — |
| A 2 | — | 50 | — | — | — | — | — | — | — |
| A 3 | — | 30 | — | — | — | — | — | 30 | — |
| A 4 | — | — | 65 | — | — | — | — | — | — |
| A 5 | — | — | — | 86 | 84 | — | — | — | — |
| A 6 | — | — | — | — | — | 80 | — | — | — |
| A 7 | — | — | — | — | — | — | 80 | — | — |
| A 11 | — | — | — | — | — | — | — | 50 | — |
| A 12 | — | — | — | — | — | — | — | — | 86 |
| P 1 | 20 | 20 | — | — | — | — | 20 | 20 | — |
| P 2 | — | — | — | — | — | 20 | — | — | — |
| P 3 | — | — | — | 14 | — | — | — | — | 14 |
| P 4 | — | — | — | — | 16 | — | — | — | — |
| P 5 | — | — | 35 | — | — | — | — | — | — |
| PAG-content % | 6.15 | 4.8 | 4.4 | 7.6 | 7.4 | 5.65 | 5.6 | 4.8 | 7.6 |
| Acid value mg KOH/g | 17.9 | 20.2 | 15.1 | 14.9 | 23.5 | 18.0 | 22.0 | 18.5 | 16.3 |
| Intrinsic viscosity (Chloroform, 20° C.) | 9.65 | 9.5 | 10.3 | 10.1 | 10.4 | 9.7 | 10.6 | 9.5 | 9.9 |
| Non-volatile % | 85 | 85 | 90 | 90 | 90 | 85 | 85 | 85 | 90 |
| Constants Of The Emulsions | | | | | | | | | |
| Non-volatile % | 40 | 44 | 42 | 43 | 42 | 45 | 45 | 45 | 43 |
| Viscosity Pa.s(+) | 105 | 125 | 175 | 180 | 165 | 140 | 95 | 95 | 205 |
| pH-value | 9.5 | 9.3 | 8.9 | 9.3 | 8.8 | 9.4 | 9.5 | 9.6 | 9.6 |

(+)Measured with Brookfield rotation viscosimeter, RVF, Spindle No. 7, 4 rpm, 20° C.

COMPARISON EXAMPLES A, B, AND C

In order to establish the unexpected advantage over the state of the art, an emulsion was prepared according to each of European Patent Application No. 0 002 488 A 1; U.S. Pat. No. 4,179,428, and Deutsche Offenlegungsschrift No. 24 16 658.

COMPARISON EXAMPLE A

An emulsion was prepared according to European Patent Application No. 0 002 488 A 1, Example 1, with a non-volatile content of 40% and a viscosity of 205 Pa.s (Brookfield RVF, Sp. 7, 4 rpm, 20° C.).

COMPARISON EXAMPLE B

An emulsion was prepared according to U.S. Pat. No. 4,179,428, Example C 2, with a non-volatile content of 54% and a viscosity of 100 Pa.s (Brookfield RVF, Sp. 7, 4 rpm, 20° C.).

COMPARISON EXAMPLE C

An emulsion was prepared according to Deutsche Offenlegungsschrift No. 24 16 658, Example 2. However, deviating from the original instructions, the resin was dissolved prior to emulsifying, with ethyleneglycol monobutylether, 90%. The addition of the solvent is to alleviate emulsifying and paint preparation, and was necessary in order to create comparable conditions for all examples. The emulsion had a non-volatile content of 51% and a viscosity (Brookfield RVF, Spindle 7, 4 rpm, 20° C.) of 175 Pa.s.

TESTING OF THE STORAGE STABILITY OF THE EMULSIONS

In order to reduce evaluation time, the storage stability was tested under forced conditions at 80° C. A temperature of 80° C. corresponds to about 500 times the stress or wear on storage at normal temperatures. The viscosity of the emulsions was measured after 8, 16, 24, and 32 hours of storage at 80° C.

TABLE 6

Change in Viscosity On Storage At 80° C.
Brookfield RVF, Sp. 7, 4 rpm, 20° C., Pa.s

| | \multicolumn{10}{c}{Example} | | | | | | | | | |
|---|---|---|---|---|---|---|---|---|---|---|
| | 1 | 2 | 3 | 4 | 5 | 6 | 7 | A | B | C |
| Start | 105 | 125 | 175 | 180 | 165 | 140 | 95 | 205 | 100 | 175 |
| 8 h/80° C. | 120 | 120 | 190 | 180 | 170 | 165 | 95 | 80 | 45 | 120 |
| 16 h/80° C. | 120 | 105 | 205 | 195 | 160 | 145 | 90 | 55 | 20 | 70 |
| 24 h/80° C. | 115 | 105 | 205 | 205 | 165 | 145 | 90 | 20(+) | (++) | 45(+) |
| 32 h/80° C. | 100 | 95 | 195 | 210 | 180 | 140 | 85 | (++) | | 20(+) |

(+)flaky precipitation
(++)solid precipitation

TESTING OF PIGMENTED PAINTS (A) Air Drying And Force Drying Paint: Employing the emulsions of Examples 1, 2, 3, 6, and 7, and of Comparison Examples A and C, paints were prepared by pigmenting in a pigment/binder ratio of 1:1 with titanium dioxide and with 3% (of resin solids) of a water-compatible siccative blend (containing 1.2% of cobalt, 7.2% of barium, 3.2% of zinc), 1% of an anti-skinning agent, and 0.5% of a leveling agent. The paints were diluted to application viscosity with deionized water.

(B) Stoving Paints: The emulsions of Examples 4, 5, and Comparison Example B are combined in a solids ratio of 70:30 with a commercially available medium reactivity water-dilutable melamine resin and pigmented in a pigment/binder ratio of 0.8:1 with titanium dioxide, and diluted to application viscosity with deionized water. In order to enhance leveling, a commercially available silicone leveling aid was added.

(B) After 8 hours:
REG: regenerated
RB: wrinkling
GM: reduced gloss
(C) Blistering, DIN 53 209

TABLE 7

| | | | | | | | Evaluation Of The Paints | | | | |
|---|---|---|---|---|---|---|---|---|---|---|---|
| | | | | | Drying | | Pendulum Hardness DIN 53 154 after | | Water Resistance | | |
| | Storage Stability | | | | Tack-Free | | | | | | |
| Example | (A) | (B) | (C) | Drying | h | Touch-Dry | 24 hrs. | 1 wk. | (A) | (B) | (C) |
| 1 | i.O. | i.O. | — | LT | 2.5 | 8 | — | 41 | E | REG | m1/g1 |
| 2 | LVA | i.O. | — | LT | 1.5 | 6 | — | 65 | LE | REG | m0/g0 |
| 3 | i.O. | i.O. | — | LT | 3.0 | 8 | — | 50 | LE | REG | m0/g0 |
| 4 | VZ | i.O. | REG | OT | — | — | 119 | — | LE | REG | m0/g0 |
| 5 | VZ | i.O. | REG | OT | — | — | 143 | — | LE | REG | m0/g0 |
| 6 | i.O. | i.O. | — | FT | — | — | 45 | — | E | REG | m1/g2 |
| 7 | i.O. | i.O. | — | FT | — | — | 58 | — | E | REG | m0/g0 |
| A | VA | LA | REG | IT | 1.5 | 6 | — | 69 | LE | REG | m0/g0 |
| B | VA | KG | NREG | OT | — | — | 135 | — | LE | REG | m0/g0 |
| C | LVA | LA | REG | LT | 8 | >24 | — | 35 | SE | RB/GM | m1/g2 |

CONDITIONS FOR EVALUATION OF THE STORAGE STABILITY

In a closed container, at 40° C., during 4 weeks, change in viscosity was observed (A), settling tendency (B), and, optionally, regeneration (C).

CONDITIONS FOR EVALUATION OF DRYING CHARACTERISTICS 24 hours after paint preparation, the paints were applied to glass strips in a dry film thickness of 30 μm, and tested. (Drying conditions: LT: air drying at 20° C.; FT: force drying of 30 minutes at 100° C. and 30 minutes of flash-off; OT: stoving for 30 minutes at 130° C. and 30 minutes of flash-off.)

CONDITIONS FOR TESTING OF WATER RESISTANCE

Evaluation after 24 hours of the application of the paints. (Air drying and force drying paints: 24 hours of water soak, at 20° C.; stoving paints: 48 hours of water soak, at 40° C.)

KEY TO ABBREVIATIONS

Storage Stability (A) Viscosity:
VZ: increase in viscosity
LVA: slight decrease in viscosity
VA: decrease in viscosity
(B) Settling Tendency:
LA: slight settling
KG: coagulated
(C) Regeneration:
REG: can be regenerated through addition of small quantities of water or triethylamine, precipitation can be stirred up
N.REG: cannot be regenerated
i.O: in order or no noticeable change

Water Resistance (A) Condition Immediately After Test:
LE: slight swelling
E: swelling
SE: severe swelling The emulsion of Example 2 utilizes a mixture of alkyd resin intermediate A 3, which is free of PEG, and alkyd resin intermediate A 2. The emulsion of Example 3 corresponds to the emulsion of Example 2 with the exception that alkyd resin intermediate A 2 was replaced by alkyd resin intermediate A 11. Intermediate A 11 corresponds to intermediate A 2 with the exception that it uses component (a 2) rather than component (a 1). The emulsion of Example 4 is identical to the emulsion of Example 9 with the exception that the alkyd resin A 5 in Example 9 was replaced with alkyd resin A 12. A 5 and A 12 differ only in that intermediate A 5 utilizes component (a 1) and intermediate A 12 utilizes component (a 2). From the evaluation it is seen that there is no significant difference in performance between Example 2 and Example 8, and Example 4 and Example 9.

As will be apparent to one skilled in the art, various modifications can be made within the scope of the aforesaid description. Such modifications being within the ability of one skilled in the art form a part of the present invention and are embraced by the appended claims.

It is claimed:
1. Process for producing improved aqueous emulsions for air drying and stoving paints based on polyethyleneglycol-modified alkyd resins, characterized in that
(a) fatty acid esters are provided wherein the saturated or unsaturated fatty acid radicals carry more than 10 carbon atoms and contain ether-like bound polyethyleneglycol radicals having an average molecular weight of between 500 and 5000;
(b) the fatty acid esters of (a) are reacted through re-esterification with alkyd resin materials to provide an alkyd resin intermediate with an acid value of below 15 mg KOH/g, a hydroxyl value of between about 50 and 250 mg KOH/g, and a PEG-level of from about 3.5 to 15% by weight;
(c) 50 to 90% by weight of alkyd resin intermediate (b) are esterified with from 10 to 50% by weight of a copolymer containing
6–40% by weight of methacrylic acid,
20–55% by weight of an unsaturated oil fatty acid with an iodine number of at least 125, and 20-70% by weight of one or more vinyl and/or vinylidene compound free from reactive functional group other than ethylenic double bonds, until an acid value of from about 10 to 35 mg KOH/g and an intrinsic viscosity in chloroform at 20° C. of from about 6 to 15 ml/g is attained, with a PEG-level of from about 3 to 8%, and (d) emulsifying the modified alkyd resin (c) in water with neutralization of the carboxy groups with ammonia or amines and the addition of up to a maximum of 20% by weight of organic auxiliary solvents.

2. The process of claim 1 further characterized in that the acid value of alkyd resin intermediate (b) is below 5 mg KOH/g.

3. The process of claim 1 further characterized in that the free hydroxyl groups of the polyethyleneglycol radical are etherified with an additional saturated fatty acid ester or with a low monoalcohol.

4. The process of claim 1 wherein the acid value of the modified alkyd resin (c) is from about 12 to 25 mg KOH/g.

5. The process according to claim 1 further characterized in that the fatty acid ester (a) is a reaction product, prepared in the presence of a catalyst, at from 100° to 150° C., of 1 mole of a polyethyleneglycol with an average molecular weight of from 500 to 5000, and 1.7 to 2.1 moles of a 1,2-epoxy compound of the general formula—

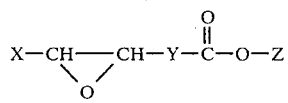

wherein x is an alkyl radical with from 2 to 8 carbon atoms, Y is an alkylene radical with from 7 to 11 carbon atoms, and Z is a saturated aliphatic, cycloaliphatic or aromatic hydrocarbon radical with from 1 to 10 carbon atoms, the reaction product having an epoxy value of below 0.02.

6. The process of claim 5 further characterized in that the epoxy value of the fatty acid ester (a) is below 0.01.

7. The process according to claim 5 further characterized in that the epoxy compound is an n-alkanol or i-alkanol ester of monoepoxy stearic acid.

8. The process according to claim 1 further characterized in that the fatty acid ester (a) is a reaction product of an epoxidized glyceride oil having an epoxy oxygen content of from 4 to 9%, and with from 0.8 to 0.95 moles per free oxirane group of a monoalkoxypolyethyleneglycol with a molecular weight of between 500 and 3000.

9. The process according to claim 8 further characterized in that the reactions between the epoxidized glyceride oil and the monoalkoxypolyethyleneglycol are carried until the reaction of at least 95% of the hydroxy groups of the monoalkoxypolyethyleneglycol is complete.

10. The process according to claim 1 further characterized in that the alkyd resin intermediate (b) includes epoxy resins of the Bisphenol-A type or styrene-allylalcohol copolymers.

11. The process according to claim 1 further characterized in that fatty acid ester (a) is introduced into a preformed alkyd resin intermediate through re-esterification.

12. Improved aqueous emulsions for air drying and stoving paints obtained by emulsifying reaction product (A)(B) in water with the neutralization of carboxy groups on said reaction product (A)(B), said reaction product (A)(B) having been produced by heating from 50 to 90% by weight of (A) an alkyd resin intermediate of a fatty acid ester wherein the saturated or unsaturated fatty acid radicals carry more than 10 carbon atoms and contain ether-like bound polyethyleneglycol radicals having an average molecular weight of between 500 and 5000 with alkyd resin components to provide an alkyd resin intermediate with an acid value of below 15 mg KOH/g, a hydroxyl value of between about 50 and 250 mg KOH/g, and a PEG-level of from about 3.5 to 15% by weight; with from 10 to 50% by weight of (B) a copolymer containing 6-40% by weight of methacrylic acid, 20-55% by weight of an unsaturated oil fatty acid with an iodine number of at least 125, and 20-70% by weight of one or more vinyl and/or vinylidene compound free from reactive functional group other than ethylenic double bonds, said heating continuing until an acid value of from about 10 to 35 mg KOH/g and an intrinsic viscosity in chloroform at 20° C. of from about 6 to 15 ml/g is attained, with a PEG-level of from about 3 to 8%.

13. The emulsion of claim 12 wherein said neutralization of the carboxy groups on said reaction product (A)(B) is with ammonia or an amine, and with the addition of up to a maximum of 20% by weight of organic auxiliary solvents.

14. The emulsion of claim 12 wherein the acid value of said alkyd resin intermediate is below 5 mg KOH/g.

15. The emulsion of claim 12 wherein the free hydroxyl groups of the polyethyleneglycol radicals are etherified with additional saturated fatty acid esters or with a low monoalcohol.

16. The emulsion of claim 12 wherein the acid value of reaction product (A)(B) is from about 12 to 25 mg KOH/g.

17. The emulsion of claim 12 wherein the fatty acid ester is a reaction product, prepared in the presence of a catalyst, at from 100° to 150° C., of 1 mole of a polyethyleneglycol with an average molecular weight of from 500 to 5000, and 1.7 to 2.1 moles of a 1,2-epoxy compound of the general formula—

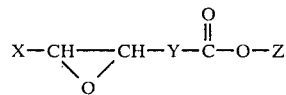

wherein X is an alkyl radical with from 2 to 8 carbon atoms, Y is an alkylene radical with from 7 to 11 carbon atoms, and Z is a saturated aliphatic, cycloaliphatic or aromatic hydrocarbon radical with from 1 to 10 carbon atoms, the reaction product having an epoxy value of below 0.02.

18. The emulsion of claim 17 wherein the epoxy value of the fatty acid ester is below 0.01.

19. The emulsion of claim 17 wherein the epoxy compound is an n-alkanol or i-alkanol ester of monoepoxy stearic acid.

20. The emulsion of claim 12 wherein the fatty acid ester is a reaction product of an epoxidized glyceride oil having an epoxy oxygen content of from 4 to 9%, and with from 0.8 to 0.95 moles per free oxirane group of a monoalkoxypolyethyleneglycol with a molecular weight of between 500 and 3000.

21. The emulsion of claim 20 wherein the reactions between the epoxidized glyceride oil and the monoalkoxypolyethylene glycol are carried until the reaction of at least 95% of the hydroxy groups of the monoalkoxypolyethyleneglycol is complete.

22. The emulsion of claim 12 wherein the alkyd resin intermediate includes epoxy resins of the Bisphenol-A type or styrene-allylalcohol copolymers.

23. The emulsion of claim 12 wherein the alkyd resin component is a preformed alkyd resin intermediate.

* * * * *